B. A. CLOONEY.
Car-Spring.

No. 161,386.

Patented March 30, 1875.

WITNESSES:
Geo. W. Fox,
J. B. Staples.

INVENTOR:
Benj A. Clooney

UNITED STATES PATENT OFFICE.

BENJAMIN A. CLOONEY, OF NEW YORK, N. Y., ASSIGNOR TO NEW YORK CAR-SPRING COMPANY.

IMPROVEMENT IN CAR-SPRINGS.

Specification forming part of Letters Patent No. 161,386, dated March 30, 1875; application filed December 4, 1874.

*To all whom it may concern:*

Be it known that I, BENJAMIN A. CLOONEY, of the city, county, and State of New York, have invented a new and useful Improvement in Railroad-Car Springs, of which the following is a specification:

My improvement has reference to that class of springs in which a hollow rubber cylinder is compounded with steel spirals; and my invention consists in so arranging and combining the steel spiral springs, made in the form of a half-round instead of round steel, upon and within the exterior surface of a rubber tube or hollow case, and in such a manner that the rounded surfaces of the steel spirals shall be in contact with the rubber, both on the exterior and interior faces of the tube, thereby presenting to the rubber a surface or face of steel in the spirals, which allows the expansion of the rubber without cutting or cramping it, and at the same time much less amount of steel is required in the spirals, and they are much more easily and perfectly tempered; and my invention also has reference to the tapering or flattening the ends of the spirals, so as to give the springs an even bearing at the ends, and thus dispense with specially fitted castings for cap and base.

Figure 1:
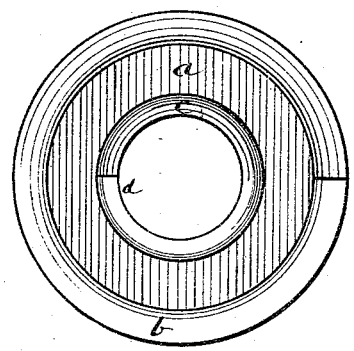
Figure 2:
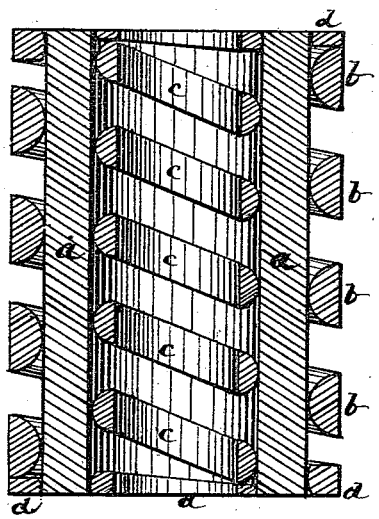
Figure 3:
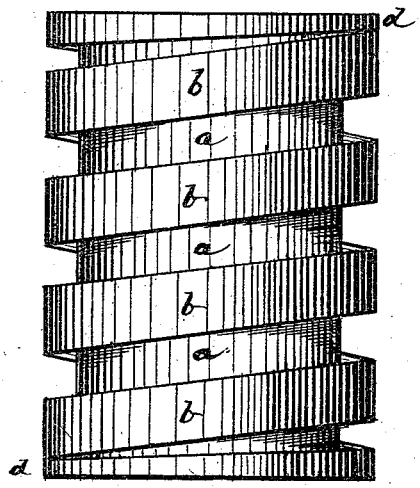

In the accompanying drawings, Figure 2 represents a central vertical cross-section through the spring. Fig. 3 represents the spring in side elevation. Fig. 1 represents an end view of Fig. 2.

Similar letters represent similar parts in all the figures.

The construction and arrangement of the spring are fully shown in the drawings, *a* being the rubber tube; *b*, the exterior half-round steel spiral; *c*, the interior half-round steel spiral, both the steel spirals presenting their rounding surfaces toward the rubber, and in contact with it. The ends of the spirals are tapered before coiling, so that their ends have an even bearing with the ends of the rubber, as at *d*, thus dispensing with the necessity of caps for the springs.

What constitutes my invention and improvement herein, and for which I desire Letters Patent, is—

A spring composed of a hollow cylinder of rubber placed between two spiral springs of half-round and half-flat coils, with the round faces next to the rubber, all combined substantially as and for the purposes set forth.

BENJ. A. CLOONEY.

Witnesses:
J. B. STAPLES,
GEO. W. FOX.